United States Patent [19]

Sternberg

[11] 4,167,728
[45] Sep. 11, 1979

[54] AUTOMATIC IMAGE PROCESSOR

[75] Inventor: Stanley R. Sternberg, Ypsilanti, Mich.

[73] Assignee: Environmental Research Institute of Michigan, Ann Arbor, Mich.

[21] Appl. No.: 742,127

[22] Filed: Nov. 15, 1976

[51] Int. Cl.$^2$ ............................................. G06K 9/12
[52] U.S. Cl. ........................... 340/146.3 MA; 364/515
[58] Field of Search ............. 340/146.3 H, 146.3 MA, 340/146.3 R, 146.3 AG; 364/200, 515

[56] References Cited

U.S. PATENT DOCUMENTS

| | | | |
|---|---|---|---|
| 3,106,698 | 10/1963 | Unger | 340/146.3 R |
| 3,106,699 | 10/1963 | Kamentsky | 340/146.3 H |
| 3,196,398 | 7/1965 | Baskin | 340/146.3 H |
| 3,287,703 | 11/1966 | Slotnick | 364/200 |
| 3,289,164 | 11/1966 | Rabinow | 340/146.3 H |
| 3,339,179 | 8/1967 | Shelton, Jr. et al. | 340/146.3 H |
| 3,573,789 | 4/1971 | Sharp et al. | 340/146.3 H |
| 3,624,604 | 11/1971 | Gibbard | 340/146.3 MA |
| 3,706,071 | 12/1972 | Gray | 340/146.3 MA |
| 3,723,970 | 3/1973 | Stoller | 340/146.3 AG |
| 3,761,876 | 9/1973 | Flaherty et al. | 340/146.3 H |
| 3,846,754 | 11/1974 | Oka et al. | 340/146.3 MA |
| 3,889,234 | 6/1975 | Makihara et al. | 340/146.3 MA |
| 3,899,771 | 8/1975 | Saraga et al. | 340/146.3 MA |
| 4,003,024 | 1/1977 | Riganati et al. | 340/146.3 MA |
| 4,060,713 | 11/1977 | Golay | 364/515 |

OTHER PUBLICATIONS

Page, "Technique for Bit-Array Manipulation," IBM Tech. Disclosure Bulletin, vol. 16, No. 6, Nov. 1973, pp. 2021-2025.

Brickman, "Optical Char. Rec. With Programmable Logic Arrays," IBM Tech. Disclosure Bulletin, vol. 18, No. 5, Oct. 1975, pp. 1520-1521.

Primary Examiner—Leo H. Boudreau
Attorney, Agent, or Firm—Krass & Young

[57] ABSTRACT

A chain of substantially identical serial neighborhood transformation modules are utilized to analyze patterns represented by a serial stream of digital electrical signals representing a matrix of points. Each module includes an input for receiving a series stream of digital output signals from the preceding module. A plurality of series connected digital storage devices are utilized to sequentially access all of the neighborhoods in the matrix. A control portion in each module analyzes each neighborhood by comparing it to a stored pattern and provides the transformed output to the succeeding module. A central programmable device coupled to the control portions of each module is provided for selectively altering the analysis of the neighborhood points in each module by providing the comparison neighborhood patterns to the control portion of the modules.

6 Claims, 12 Drawing Figures

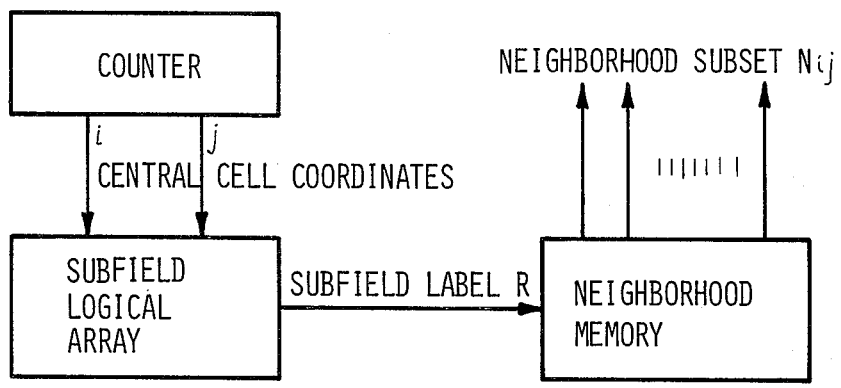
Fig-10
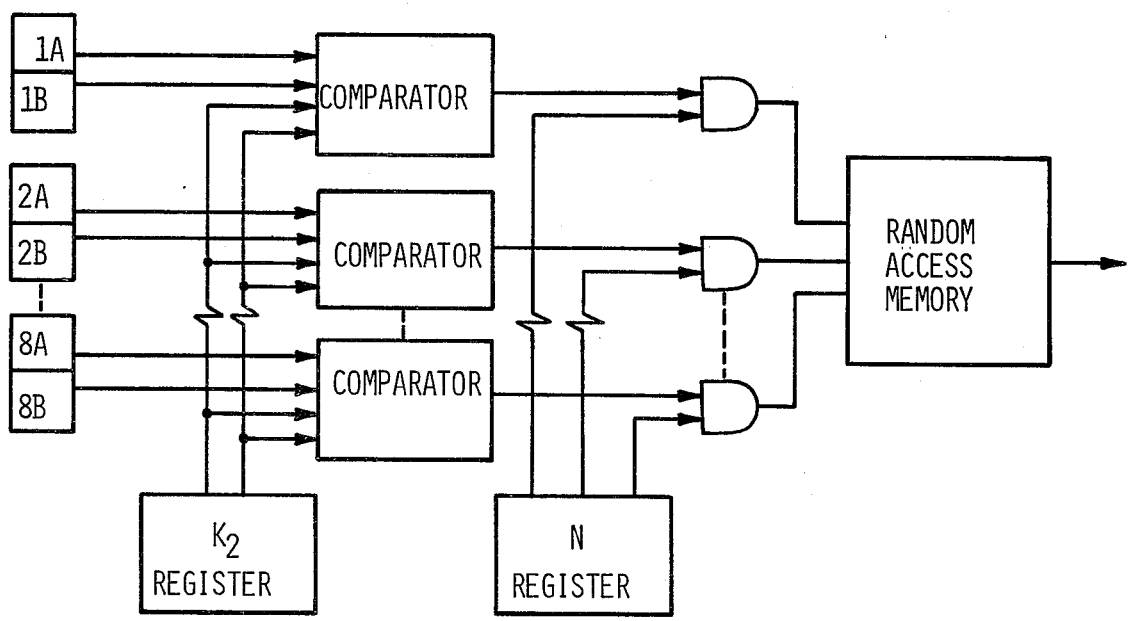
SUBFIELD EX.A    SUBFIELD EX.B
Fig-11
Fig-12

AUTOMATIC IMAGE PROCESSOR

BACKGROUND OF THE INVENTION

1. Field of the Invention

This invention relates to pattern recognition and analysis devices and more particularly to a class of automatic image processors employing techniques of integral geometry and other mathematical methods to classify patterns in an input silhouette image.

2. Prior Art

A wide variety of applications exist in which it would be desirable for a machine to automatically recognize, analyze, and/or classify patterns existing in silhouette images (solid black forms against a white background). Some of the simpler problems, which have been implemented with at least limited success by machines, include the recognition of alphanumeric characters and recognition or counting of certain particles, such as blood cells. More ambitious tasks of this class, which appear to be beyond the ability of present technology, would be automatic recognition of military targets from infrared imaging sensors, or the translation of handwriting into a machine usable code.

Elaborate programs have been written for general purpose computers to perform pattern analysis and classification. The limited success of the general purpose computer to perform pattern analysis and classification is due to the extremely long processing times to process images with very many data points. A more promising approach may be the use of a special purpose processor which implements a mathematical technique applicable to data in the form of images, integral geometry being such a technique. One such approach considers the input data as an M by N array of zeroes and ones representing black or white picture elements. From the input array another M by N array is derived wherein each point in the second array is a function of the state of the equivalent point in the initial array and of various neighboring points in the initial array. A series of these transforms may be performed to determine some of the characteristics of patterns displayed in the initial array. For example, U.S. Pat. No. 3,241,547 discloses such a special purpose image processor used for counting lymphocytes in blood. Devices employing similar forms of processes for implementing these "neighborhood transforms" are disclosed in "Pattern Detection and Recognition" by Unger, Proceedings of the IRE, 1959, page 737, and "Feature Extraction" by Goley, "Hexagonal Pattern Transformers", Preston, Jr., IEEE Transactions on Computers, Volume C-20, No. 9, September, 1971.

Another class of special purpose machines for implementing a form of integral geometry analysis employing what the author terms "hit-or-miss transformations" is disclosed in "The Texture Analyzer", Journal of Microscopy, Volume 95, Part II, April, 1972, pages 349-356.

These prior art image processors have all operated on images wherein the data points have been reduced to binary form, either zero or one, in with the conventional requirements of integral geometry. For applications of integral geometry in pattern recognition see:

1. G. Matheron, "Random Sets and Integral Geometry, Wiley, 1975."

2. Albert B. J. Novikoff, "Integral Geometry as a Tool in Pattern Perception", in Principles of Self-Organization, edited by Von Foerstn and Zopf, Pergamon Press, 1962.

3. J. Serra, "Stereology and Structuring Elements", Journal of Microscopy, Volume 95, Part 1, February 1972, pages 93-103.

SUMMARY OF THE INVENTION

The present invention is broadly directed toward an image processor employing an extension of the integral geometry concept wherein the transformations involve matrices in which each point of an image may be assigned a greater number of states than the states that may be assumed by an image point in the original image. For example, if the original digitized image is a silhouette, having image points expressed as binary values, the matrices resulting from transformations of that image may have three or more possible image point states or values. The extension of integral geometry to these multiple state transforms, and the circuits disclosed by the present application for implementing the mathematical techniques, are substantially simpler and/or more powerful than the corresponding techniques and machines of the prior art and result in a substantial advance in the ability to recognize, analyze, and classify silhouette patterns.

As disclosed in the following detailed description of a preferred embodiment of the invention, the image processor takes the form of a serial chain of identical processing stages, each stage consisting in part of multi-bit shift registers and random access memories, implemented by any memory technology such as core, semiconductor, or magnetic bubble. In the preferred embodiment, each image point is expressed in two binary bits so that it may assume one of four possible states. In alternative embodiments, the range of image point states could be higher. The function of the shift register in each processing stage is to gain sequential access to all possible neighborhoods in the input image to the stage. To this end it is assumed that the image points are provided to the stage in sequential form, scanned line by line. The shift register contains output ports at suitable locations such that the value of any point and its immediate neighbors may be simultaneously examined. These simultaneously available values form the argument of a logical function which is implemented in the form of a random access memory, a programmable logic array, or a network of logic elements.

As the values of the points represented in the matrix are shifted through the register, each data point and its neighbors are sequentially examined and the logic generates a transformed data point which is a function of the value of the equivalent data point in the input image and the values of the neighboring data points in the input image. The logical function implemented on these neighborhood values produces the output of a single processor stage and are fed to the next processor stage in the chain where another transformation is performed.

The nature of the transformation performed by each of the processor stages may be modified under control of a central programming unit which communicates with each image processing stage.

The concept of performing multi-stage integral geometry transformations in a serial network of identical processing stages eliminates the need for a variety of peripheral image storage devices and arithmetic and logical elements normally associated with special purpose image processors. Moreover, the output of each processing stage occurs at the same rate as its input, its speed of operation limited only by the shift register and logic technology employed. Therefore, the serial processor handles data produced by a line scanning sensor at a real time rate, the analyzed image being continuously available at the output of the last processing stage with only a fixed delay proportional to the number of processing stages in the serial string.

The method of processing data represented by the present invention broadly involves the implementation of neighborhood transforms on a two-dimensional matrix formed of image data points having "N" possible states to create transformed matrices wherein each image data point is expressed in N±M possible states. For example, if each image data point has two possible values in the input data, the first processing stage may generate a transformed matrix wherein each image data point may have one of three values. Subsequent transforms performed by later processing stages in the chain may increase or decrease the number of states that may be assigned to an image data point. While most of the transforms will increase or decrease the number of permissible states used to express an image data point by one, the method is general enough to encompass transformations which change the number of permissible states by more than one.

As a simple example of an analytic method implementable in the present invention, consider the two-dimensional array of ones and zeroes illustrated in FIG. 1, the ones forming a number of open non-intersecting curves of various lengths. Consider the process of selecting those of the curves having a length greater than L, an even integer expressed in units of the minimum spacing between two array points, i.e., the resolution limit of the two-dimensional rhombic array. The first processing stage of a serial string of stages implements a neighborhood transformation on the input array wherein all 1's having a single immediate neighboring 1 are converted to 2's, all other image points maintaining their initial states (FIG. 2). This transform marks the end points of each of the lines. Next, a series of identical transformations are performed wherein each image point of value 1 having a 2 in its immediate neighborhood is converted into a 2. This transformation is performed L/2-1 times in L/2-1 processing stages following the initial stage of the string. At this point all lines of length less than or equal to L will consist solely of 2's, and the longer lines will have a central portion of 1's (FIG. 3). Next a series of L/2 transformations are performed in the next L/2 processing stages wherein each point which is a 2 and has an immediate neighboring 1 is converted to a 1. After this series of transformations, lines of length greater than L will be represented by 1's, and lines of length L or less will be represented by 2's (FIG. 4). Thus, the lines have been discriminated into two groups according to their lengths and marked by two different image data point values. The analysis is implemented in a string of L processing stages.

In considering this series of transforms, it should be noted that the transformed image of every stage in the series contains a sufficient amount of information to reconstruct the original input image. Thus, there is no need to store the initial image nor any intermediate image as is required in the prior art image analysis systems; nor is there any need to add or subtract images from one another as required by prior art image analyzers since the same equivalent results may be achieved by the transformations implementable in the present invention.

To perform the above analysis on an image processor formed in accordance with the present invention it is simply necessary to program a series string of processing stages of a length equal to the number of neighborhood transformations in the length discrimination algorithm. The individual stages of the serial processor can be programmed to accomplish a particular neighborhood transform from a central controller, taking its data from a keyboard or any other suitable information source. Alternatively, a higher level programming language could be devised to program the individual processing stages. For example, implementing the series of transformations described above, the number L could be entered into the central controller from a keyboard. The central controller would then program the appropriate stages in the string at appropriate points rather than the user being required to repeatedly designate the required transformation L+1 times.

Each processor module performs a similar transformation on its input data stream. First, the central cell of the nine cell neighborhood is checked to determine whether it has value K1. Next, a subset N of the eight boundary neighboring cells are checked to determine whether there exists at least one cell of the subset having value K2. If these two conditions are met, then the value of the central cell is changed to K3. Programming a processor module consists of inserting values for N, K1, K2 and K3 into the proper storage registers in the module.

A preferred embodiment of the image processor formed in accordance with the present invention and representative forms of the processing methods of the present invention are disclosed in the following detailed description. The description makes reference to the accompanying drawings in which:

Figures 1, 2:
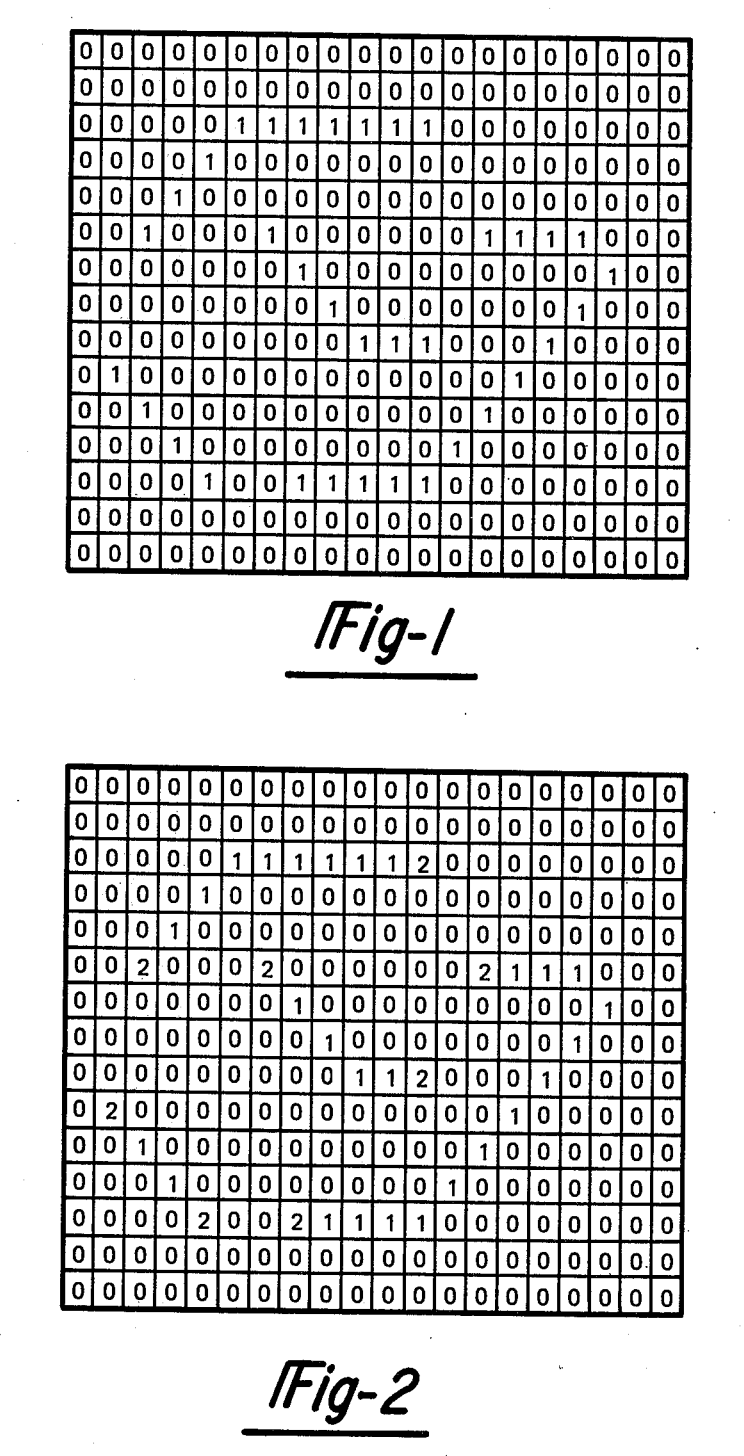
Figures 3, 4:
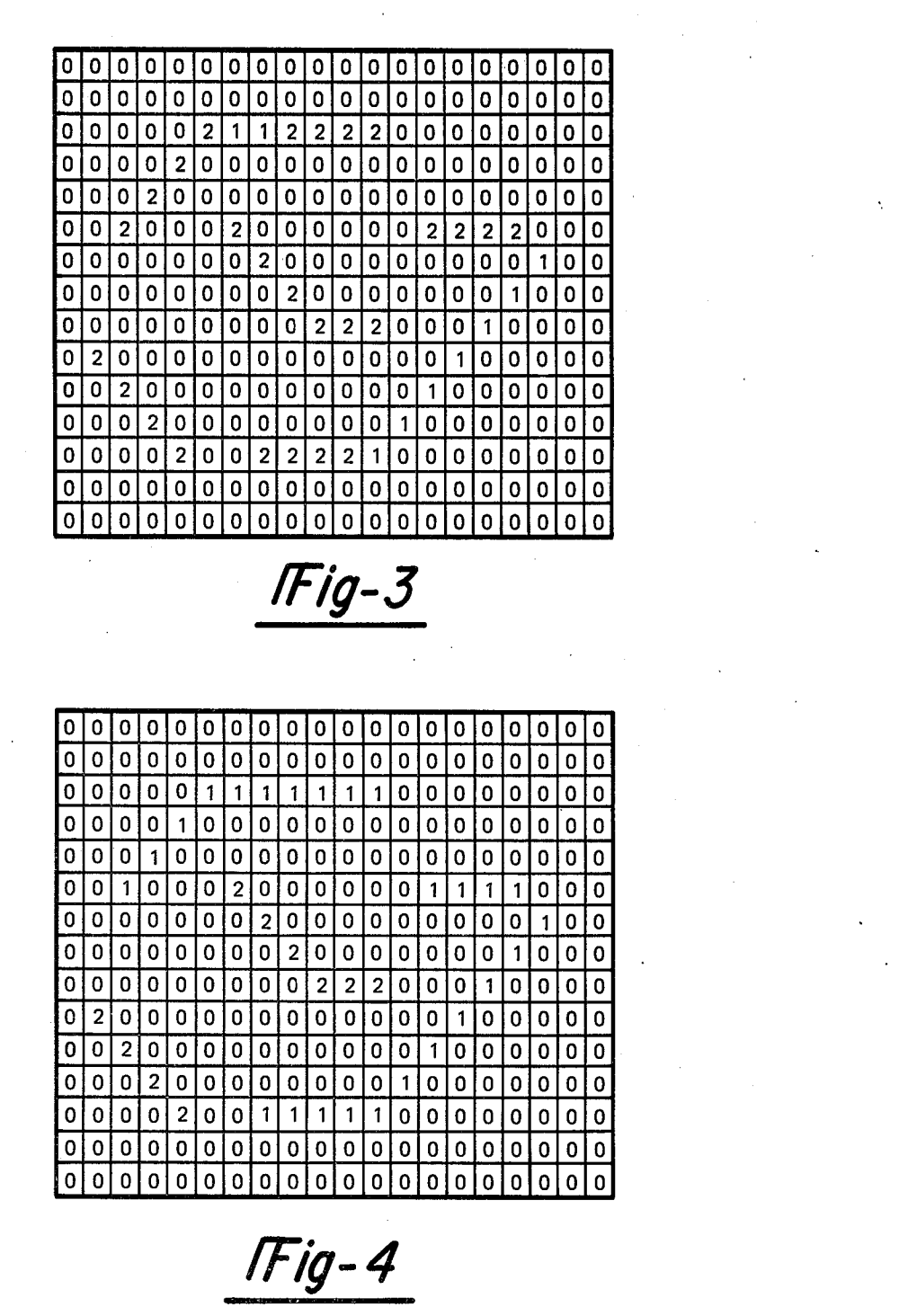

FIGS. 1-4 are schematic illustrations showing a sequence of transformations utilizing the apparatus of the present invention;

FIG. 10 is a block diagram of circuitry within each of the modules of FIG. 5 for determining a position dependent neighborhood subset;

FIG. 11 is an illustration of typical subfields defining the set of positions in the input array which are processed with identical neighborhood configurations by the modules employed in the system of FIG. 5; and FIG. 12 is a block diagram of an alternative configuration for the circuitry for comparing the values of each cell neighbor to the contents of the K2 register.

Figure 5:
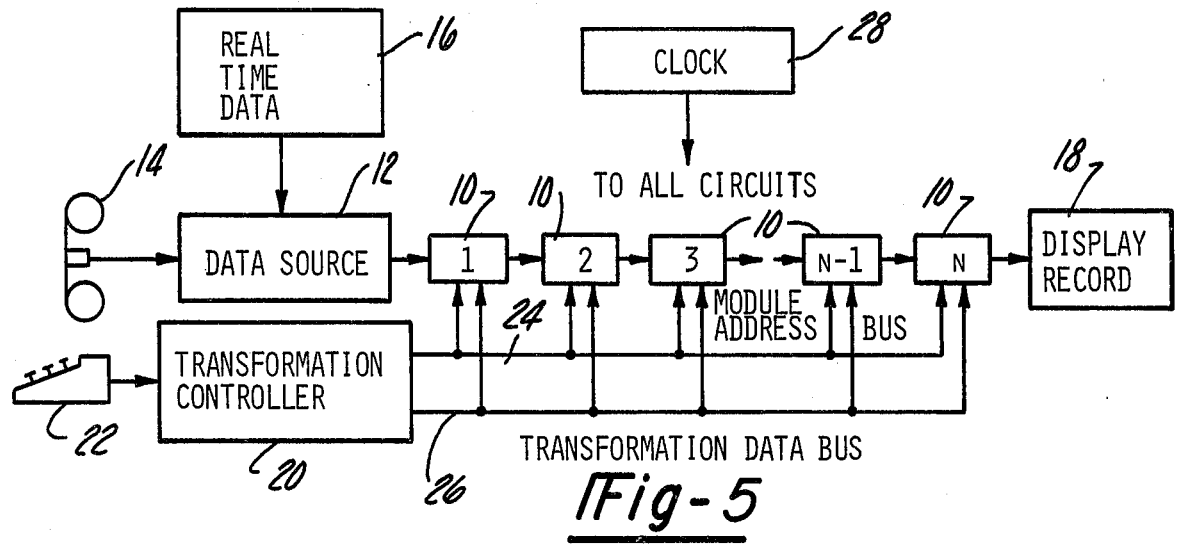
FIG. 5 is a block diagram of a computer for implementing the transforms of the present invention representing a preferred embodiment of apparatus of the present invention.

The methods of the present invention may be practiced by suitably programmed general purpose computers but are of such form as to make possible a class of relatively simple and extremely powerful special purpose computers. As illustrated in FIG. 5, a preferred embodiment of the computer of the present invention consists of a plurality of modules 10, which are substantially identical to one another and are connected in serial fashion, with the output of one module providing the input to the next module in the chain. The number of available modules limits the number of transformations that the computer can perform on a data input in a single pass. Since each module is relatively simple and inexpensive, computers having hundreds or thousands of modules are physically realizable and compare favorably in cost to a general purpose computer.

The input data matrix to the first module 10 in the chain is from a data source 12 which may include a storage device, such as a tape 14, or could represent a digitizer operating on a data stream provided by a real time device such as a radar receiver 16.

The output of the final module 10 in the chain is provided to a display or recording device 18 which could take the form of a cathode-ray display or a tape recorder or the like which could later be used to fill a display.

The transformation that is performed by each of the modules 10 is determined by a transformation controller 20. The operation of the controller may be modified by a keyboard 22, or other suitable program source, such as punched cards, tape, etc. The controller 20 connects to each of the modules through an address bus 24 and a transformation bus 26. To modify the transformation formed by a single module, the controller 20 first generates the address of that module on the bus 24 and then generates an appropriate transformation code on the bus 26. Each module 10 contains a stored unique address means for comparing an address provided on the bus 24 with that stored address. When comparison is noted, the transformation code which follows on bus 26 is stored in the module and controls its mode of operation.

All of the circuits within the computer operate on a synchronous basis under control of timing signals generated by a clock 28.

Figure 6:
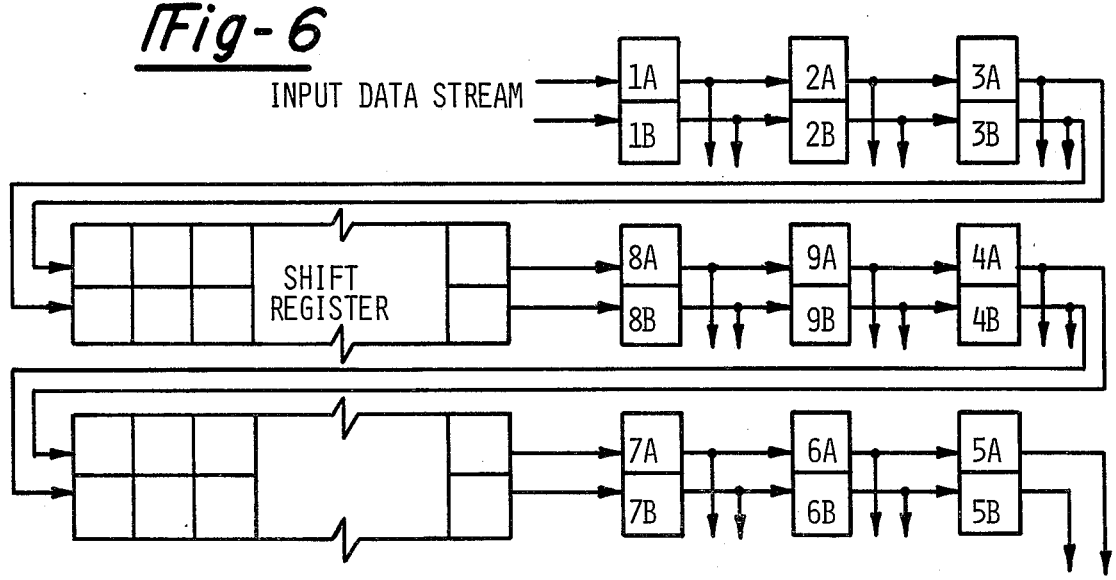
FIG. 6 is a block diagram of a portion of the circuitry of a typical module employed in the system of FIG. 5 for sequentially extracting the cell neighborhoods from an input data stream.

The major logical assemblies of a typical module 10 are detailed in FIGS. 6–10. FIG. 6 illustrates the shift register arrangement for sequentially extracting the nine cell neighborhoods from the input data stream. In this illustration, each cell can take on any one of four possible values, thus two bits of storage per cell are required of all shift register stages. If the input data matrix is W elements wide, the shift register must be W-3 stages long.

Figure 7:
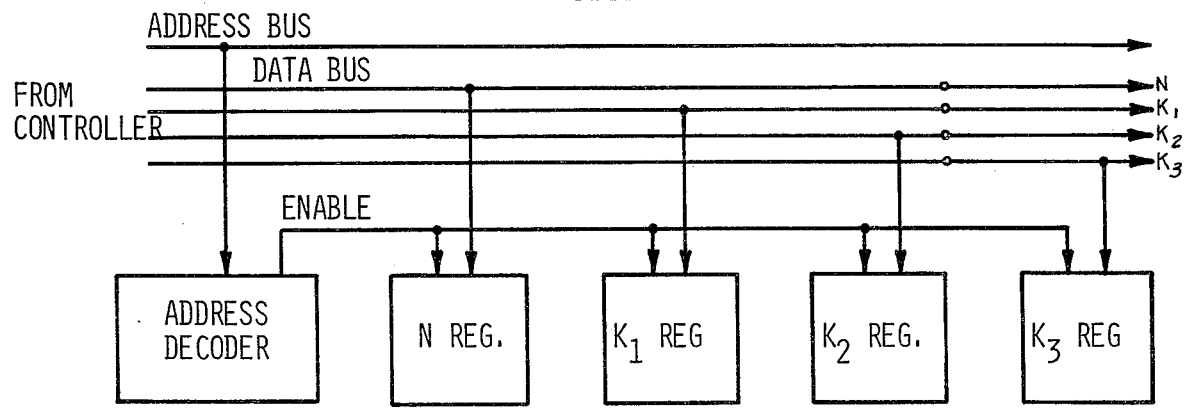
FIG. 7 is a block diagram of the address decoder and storage register arrangement of one of the modules employed in FIG. 5.

Each processor module has an address which is determined by its position in the processor module chain. To program a module, the controller simultaneously transmits the address of the module which is to be programmed on the address bus and the values of N, K1, K2 and K3 on the data bus. The value of N is an eight bit binary number, where a one in the ith bit position indicates that the boundary neighborhood cell i is to be included in the neighborhood subset N of the central cell (see FIG. 6 for boundary neighborhood cell numbering). FIG. 7 illustrates the address decoder, storage register arrangement.

Figure 8:
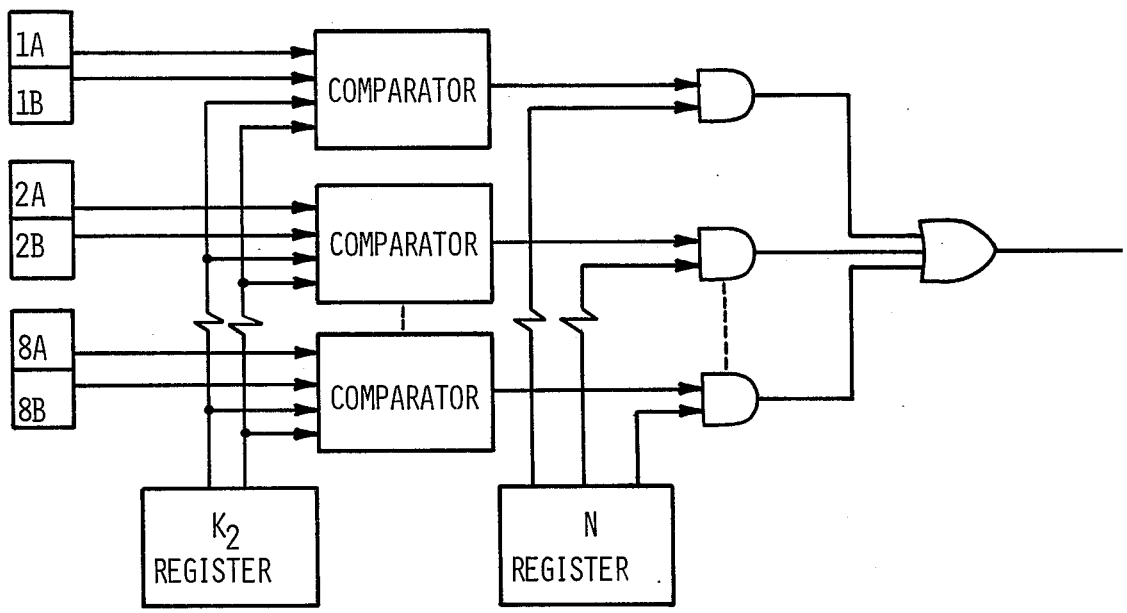
FIG. 8 is a block diagram of the circuitry employed in the module of FIG. 5 for determining the identity between the neighboring cell values and the contents of the K2 register.

For each extracted neighborhood, the two bit value of each neighbor is compared to the contents of the K2 register in a bank of eight comparators (FIG. 8). The output of a comparator is one if, and only if, the contents of the neighborhood cells matches the contents of the K2 register. The output of each comparator is then gated by the appropriate bit on the neighborhood subset register, or N-register. The output of any gate is one if, and only if, its corresponding neighborhood position is included in the neighborhood subset N and the contents of the neighborhood cell has value K2. A single OR gate examines each AND gate output, its output being a one if, and only if, at least one neighboring cell in the subset N has a value K2.

Figure 9:
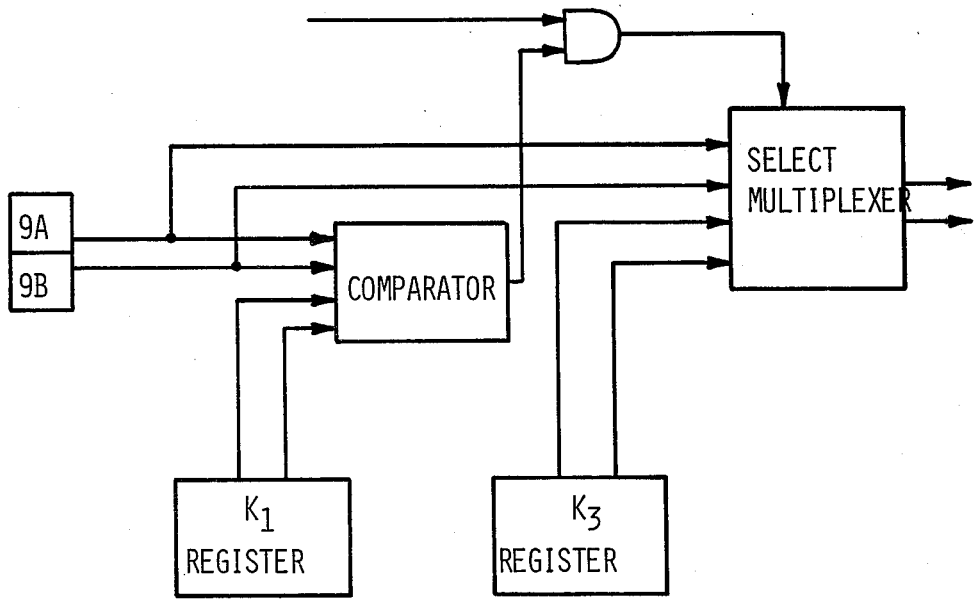
FIG. 9 is a block diagram of the circuitry in a module of the system of FIG. 5 for determining the identity between a central cell and the contents of the K1 register.

The contents of the central cells are compared to the contents of the K1 register in the comparator shown in FIG. 9. The output of the comparator is a one if, and only if, the central cell has value K1. This condition satisfied in conjunction with the previously derived condition on the neighboring cells causes the output of the multiplexer to be set to K3, otherwise, the output of the multiplexer is equal to the content of the central cell. The output of the multiplexer constitutes the output data stream of a module.

It may not always be desirable to process each cell in an array in exactly the same manner, independent of its position in the array. In general, the subset N of neighbors of a central cell whose position is i, j in the array can be a function of the central cell position. The manner of determining the position dependent neighborhood subset $N_{ij}$ is illustrated in FIG. 10. The set of all cell positions in the input array which are processed with identical neighborhood configurations constitutes a subfield. An array may be partitioned into M subfields, where M may be equal to 2, 3, 4 or more. Some useful subfields are illustrated in FIG. 11.

For subfield processing, it is convenient to replace the N-register with a more extensive memory element, one holding M eight bit words corresponding to M neighborhood subsets, one for each of M possible subfields. The output of this neighborhood memory device is selected by the input to the device which is the subfield label R, where $R = 1, 2, \ldots, M$. The neighborhood memory device is programmable from the controller via the address and data bus in a manner similar to the scheme illustrated to program the N-register.

The subfield label R is derived from the central cell position i, j in the subfield logical array. The exact nature of the subfield logical array network depends upon the number of subfields and their particular configuration in the data array. Since central cells are examined sequentially, the central cell coordinates can be kept track of by a counter, provided the counter is initially set by the controller corresponding to the position of the processing module in the processing chain.

The neighborhood processing stage illustrated in FIGS. 6–10 is sufficiently general so that all useful neighborhood transformations can be accomplished by one or more processing stages arranged in series. The circuit of FIG. 12, however, is useful in that certain types of transformation may be accomplished by a single processing stage rather than a series of processing stages. The circuit of FIG. 12 is identical to the circuit of FIG. 8, except that the OR gate has been replaced by a generalized logical function of eight variables, stored in a random access memory. The RAM is of course programmable from the controller via the address and data buses.

The embodiments of the invention in which an exclusive property or privilege is claimed are defined as follows:

1. Apparatus for analyzing patterns comprising:
generator means for producing a serial stream of digital electrical signals having a plurality of permissible states representing a matrix of points constituting a pattern;
a chain of substantially identical serial neighborhood transformation modules, each module having an input for receiving a series stream of digital output signals from the preceding module; neighborhood extraction means including a plurality of series connected digital storage devices for temporarily storing a neighborhood in the matrix comprised of the states of a central data point and its surrounding points in the matrix; means for shifting the signals through the storage devices to sequentially access all of the neighborhoods in the matrix; and digital control means coupled to the storage devices for analyzing each neighborhood as it is presented to the storage devices and providing an output signal to the input of the subsequent module depending upon the analysis, said control means comprising means for storing a neighborhood pattern and means for comparing said stored pattern with the neighborhood stored in the storage devices of the neighborhood extraction means;
central programmable means coupled to the control means of each module for selectively altering the analysis of the neighborhood of points in each module by providing the neighborhood patterns to the control means of the modules;
the first transformation module having its input coupled to said generator means, and the last module having its output coupled to an output device for utilizing the transformed output matrix.

2. The apparatus of claim 1 wherein the output signal of the control means has a greater number of permissible states than the points under analysis.

3. The apparatus of claim 2 wherein the output device for utilizing the transformed matrix includes a display device for displaying a matrix of points representing a pattern in which each point in the displayed matrix may have a greater number of permissible states than its equivalent point in the original matrix supplied to the first module.

4. The apparatus of claim 1 wherein said neighborhood consists of an $N \times M$ array of points, and wherein said neighborhood extraction means includes $N \times M$ storage devices.

5. The apparatus of claim 1 wherein said control means includes:
means for comparing the state of the central point in the neighborhood with a value supplied by said programmable means.

6. The apparatus of claim 1 wherein said control means includes:
means for comparing the states of the surrounding points in the neighborhood with a value supplied by said programmable means.

* * * * *